(12) United States Patent
Huschenhoefer et al.

(10) Patent No.: US 11,815,145 B2
(45) Date of Patent: Nov. 14, 2023

(54) CARRIER POT FOR A BRAKE DISC, BRAKE DISC ARRANGEMENT

(71) Applicant: Robert Bosch GmbH, Stuttgart (DE)

(72) Inventors: Wolfgang Huschenhoefer, Asslar (DE); Karim Bahroun, Grossbettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 334 days.

(21) Appl. No.: 16/348,373

(22) PCT Filed: Nov. 7, 2017

(86) PCT No.: PCT/EP2017/078383
§ 371 (c)(1),
(2) Date: May 8, 2019

(87) PCT Pub. No.: WO2018/087053
PCT Pub. Date: May 17, 2018

(65) Prior Publication Data
US 2019/0264763 A1     Aug. 29, 2019

(30) Foreign Application Priority Data

Nov. 9, 2016   (DE) ...................... 10 2016 221 969.3

(51) Int. Cl.
*F16D 66/00*     (2006.01)
*F16D 65/12*     (2006.01)
*F16D 65/02*     (2006.01)

(52) U.S. Cl.
CPC .......... *F16D 66/00* (2013.01); *F16D 65/123* (2013.01); *F16D 2065/1316* (2013.01);
(Continued)

(58) Field of Classification Search
CPC .. F16D 66/00; F16D 65/123; F16D 2200/006; F16D 2065/1316;
(Continued)

(56) References Cited

U.S. PATENT DOCUMENTS 5,574,430 A * 11/1996 Ott ..................... G08B 13/1463
340/566
2002/0148690 A1 * 10/2002 Wirth ..................... G01K 1/024
188/1.11 E (Continued)

FOREIGN PATENT DOCUMENTS

| CN | 1335244 | 2/2002 |
| CN | 201000458 | 1/2008 |

(Continued)

OTHER PUBLICATIONS

International Search Report corresponding to PCT Application No. PCT/EP2017/078383, dated Mar. 2, 2018 (German and English language document) (6 pages).

*Primary Examiner* — Melody M Burch
(74) *Attorney, Agent, or Firm* — Maginot, Moore & Beck LLP

(57) ABSTRACT

A carrier pot for a brake disc includes a radially inner hub ring portion for fastening to a wheel axle, a radially outer brake disc ring portion for fastening to the brake disc, and at least one electric/electronic functional component. The carrier pot is made from a fiber-plastic composite and the at least one electric/electronic functional component is integrated into the fiber-plastic composite.

14 Claims, 1 Drawing Sheet

(52) U.S. Cl.
CPC ............... *F16D 2065/1388* (2013.01); *F16D 2066/001* (2013.01); *F16D 2066/003* (2013.01); *F16D 2066/005* (2013.01); *F16D 2200/006* (2013.01)

(58) Field of Classification Search
CPC ....... F16D 2065/1388; F16D 2066/006; F16D 2066/003; F16D 2066/005; F16D 2066/001
See application file for complete search history.

(56) References Cited

U.S. PATENT DOCUMENTS

| | | | |
|---|---|---|---|
| 2011/0291805 A1* | 12/2011 | Gelowitz | G06K 19/07749 340/10.1 |
| 2013/0032440 A1 | 2/2013 | Karl et al. | |
| 2013/0161137 A1* | 6/2013 | Huschenhoefer | F16D 65/127 188/218 XL |
| 2018/0231065 A1* | 8/2018 | Buchanan | F16D 69/00 |

FOREIGN PATENT DOCUMENTS

| | | |
|---|---|---|
| CN | 101925753 | 12/2010 |
| CN | 103185088 A | 7/2013 |
| CN | 104126079 A | 10/2014 |
| CN | 105593553 A | 5/2016 |
| CN | 106068397 A | 11/2016 |
| DE | 10 2013 201 303 A1 | 8/2013 |
| EP | 1 107 007 A2 | 6/2001 |
| JP | 200411746 A * | 1/2004 |

* cited by examiner

CARRIER POT FOR A BRAKE DISC, BRAKE DISC ARRANGEMENT

This application is a 35 U.S.C. § 371 National Stage Application of PCT/EP2017/078383, filed on Nov. 7, 2017, which claims the benefit of priority to Serial No. DE 10 2016 221 969.3, filed on Nov. 9, 2016 in Germany, the disclosures of which are incorporated herein by reference in their entirety.

The disclosure concerns a carrier pot for a brake disk, with a radially inner hub ring portion for fastening to a wheel axle and with a radially outer brake disk portion for fastening to a brake disk.

Furthermore, the disclosure concerns a brake disk device for a wheel brake of a vehicle, in particular a motor vehicle, with at least one brake disk and with at least one carrier pot that is rotationally fixedly connected to the brake disk.

BACKGROUND

Carrier pots and brake disk devices of the aforementioned type are already known from the prior art. Usually, brake disk devices comprise a brake disk and a carrier pot that are rotationally fixedly connected to each other, wherein as a rule the brake disk is fastened, in particular bolted and/or welded, to the radially outer brake disk ring portion of the carrier pot in this case. The carrier pot is used here as a connection between the brake disk and the wheel axle, so that the braking forces are transferred to the wheel axle by means of the carrier pot during a braking process. Thus, high requirements are placed on the carrier pot regarding load capability and durability. In order to satisfy said conditions, known carrier pots are therefore often made of cast iron or aluminum, in particular in one piece together with the brake disk. In the case of a two-part form of a brake disk device it is known to make the carrier pot of a different material from the brake disk itself in order to match both elements optimally to the respective loadings thereof. In this case moreover, the aim is to achieve weight savings in order to reduce the fuel consumption of the motor vehicle, for example.

SUMMARY

The carrier pot has the advantage that on the one hand it is manufactured in a weight-saving manner and on the one other hand it enables monitoring of the behavior of the brake disk device on an unsprung mass of the vehicle or motor vehicle containing the brake disk device. For this purpose, according to the disclosure it is provided that the carrier pot is manufactured of a fiber-plastic composite and comprises at least one electrical/electronic functional component that is integrated in the fiber-plastic composite. As a result, an electrical/electronic functional component is integrated in the carrier pot, which is possible without great additional cost because of the layered structure of a fiber-plastic composite part. In this case, the arrangement of the functional component on the carrier pot is carried out securely and permanently, wherein high loads, in particular high accelerations, that act on the functional component do not become a danger to the functional component. Due to the manufacture of the carrier pot from a fiber-plastic composite, the carrier pot has a comparatively low weight. Due to the advantageous integration of the functional component, moreover the carrier pot makes it possible to monitor the state of the carrier pot and/or the brake disk device in a simple way without resulting in a disadvantageous increase in weight. Owing to the integrated functional component, continuous monitoring of the state of the carrier pot as a safety-relevant component of the brake disk device and the vehicle can be carried out, for example. It is also possible to detect environmental values in the immediate surroundings of the carrier pot by the functional component, and to take said environmental values into account when actuating a wheel brake comprising the brake disk device, for example. In particular, the functional component is integrated within the fiber-plastic composite such that it cannot be removed therefrom without destroying material. As a result, the authenticity of the carrier pot is always guaranteed and manipulation by a third party cannot be carried out, or at least not without being noticed.

According to a preferred development of the disclosure, it is provided that the component of the fiber-plastic composite is completely enclosed. As a result, the functional component is disposed completely within the carrier pot and as a result is reliably protected against external influences.

Alternatively, it is preferably provided that the functional component of the fiber-plastic composite is only partly enclosed. As a result, the functional component has access to the surroundings of the carrier pot in order for example to be able to detect environmental values of the carrier pot when embodied as a sensor or to pass on detected values to a data processing system when embodied as a wired or wireless signal line.

Particularly preferably, it is provided that the functional component is positively fastened by means of the fiber-plastic composite, so that the position of the functional component on the carrier pot is permanently guaranteed. In particular, high accelerations acting on the functional component can also not result in a change in the position of the functional component.

Furthermore, it is preferably provided that the functional component comprises at least one sensor module comprising an inertial sensor, an acceleration sensor, a speed sensor, a position sensor, a temperature sensor, a pressure sensor, a material tension sensor and/or a moisture sensor. The functional component is thus ultimately especially a sensor module for detecting movement and/or load values relating to the carrier pot. It is also possible to determine ambient conditions of the carrier pot, in particular in the embodiment as a moisture sensor or pressure sensor, in particular as an air pressure sensor.

According to an advantageous development of the disclosure, it is provided that the functional component or the electrical circuit comprises a power supply device, which in particular comprises an electrical generator and/or a receiver for supplying power wirelessly. As a result, a simple supply with electrical energy is guaranteed, in particular for the sensor module.

Furthermore, it is preferably provided that the functional component comprises a communications interface that is designed to send and/or to receive data contactlessly and/or with contact. As a result, it is in particular possible that the data that is determined/detected by the sensor module can be detected or called up by an external control unit, a test unit and/or an analysis unit contactlessly and/or with contact.

The carrier pot preferably comprises a plurality of functional components that are disposed uniformly distributed over the circumference of the carrier pot. Due to the uniformly distributed arrangement, it is guaranteed that there is no imbalance on the carrier pot that could affect the operation.

Furthermore, it is preferably provided that the functional component comprises an identification device, in particular an RFID chip. As a result for example, the carrier pot can be identified contactlessly by a fitter, for example. Because of the captive integration of the functional component in the carrier pot, the identification is thereby unambiguous and cannot be manipulated. Moreover, it is preferably provided that the functional component comprises an energy storage device and/or an energy generator. The energy generation can be carried out by converting the kinetic energy introduced into the component in the particular application or by wireless energy transfer. As a result, supplying power to the functional component and thus the detection of the ambient conditions are possible without additional contact. In particular, the energy storage device and/or the energy generator are components of the aforementioned power supply device.

The brake disk device according to the disclosure with the features further disclosed herein is characterized by the embodiment of the carrier pot according to the disclosure. The already mentioned advantages result because of this.

Further advantages and preferred features and combinations of features result in particular from the previously described matters and from the claims.

BRIEF DESCRIPTION OF THE DRAWINGS

The disclosure will be described in detail below using an exemplary embodiment. In the figures.

DETAILED DESCRIPTION

Figure 1:
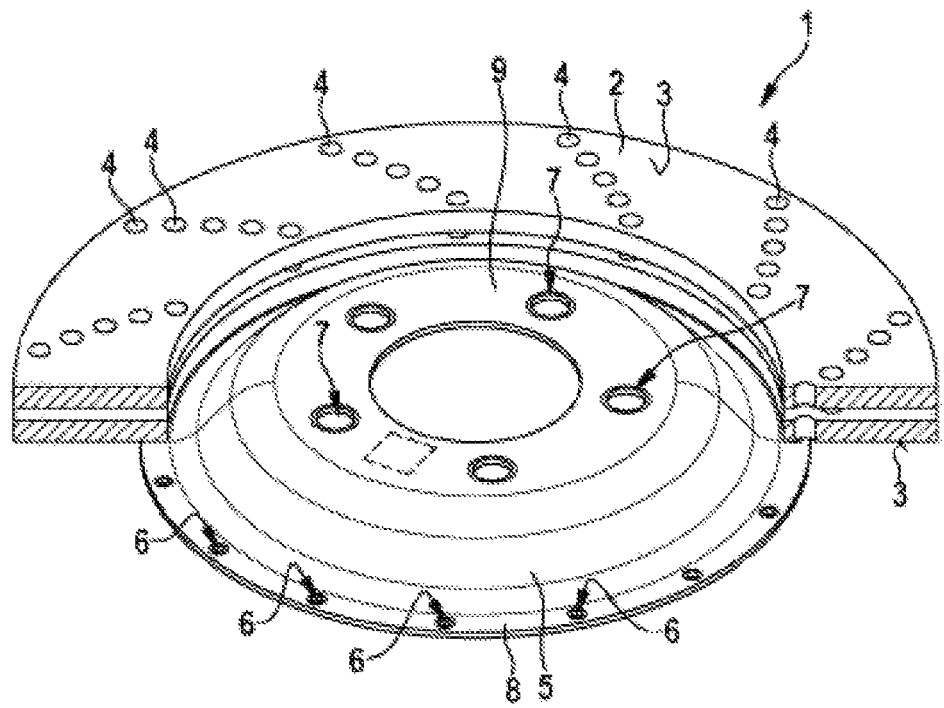
FIG. 1 shows an advantageous carrier pot for a brake disk device.

FIG. 1 shows in a perspective sectional representation a brake disk device 1 for a wheel brake of a motor vehicle. A wheel brake in conventional motor vehicles usually comprises a brake caliper, on which are disposed brake linings between which a brake disk is guided. If the brake linings are moved towards the brake disk, the disk is clamped between them and as a result a brake force or a brake torque is produced.

The brake disk 2 shown in FIG. 1 of the brake disk device 1 is advantageously formed point symmetrically in relation to the axis or circular for this purpose. On the axial end faces thereof, it comprises brake surfaces 3 that interact with the brake linings of the wheel brake. The brake linings are embodied in annular form and comprise in the present case a plurality of ventilation openings 4 for cooling the brake disk device 1 during operation. The cooling is advantageous, since brake disks in a braking process are subjected to high mechanical and thermal loads. The cause of this is that during the deceleration of the vehicle comprising the brake disk device almost the entire kinetic energy stored in the vehicle must be converted into heat. Since the brake disk 2 represents an unsprung rotating mass in the vehicle, the aim is to reduce the mass of the brake disk 2.

The brake disk 2 is fixedly joined to a carrier pot 5 that can be fastened to a wheel hub or to a rim of a wheel of the vehicle in order to transfer the braking forces to the wheel. With conventional brake disk devices, the carrier pot 5 and the brake disk 2 are made together in one piece, for example by an iron casting method. In order to reduce the mass of the brake disk device 1, it is also known by now to form the carrier pot 5 and the brake disk 2 separately from each other in order to enable advantageous material combinations for the carrier pot 5 and the brake disk 2, in particular for the friction ring of the brake disk 2. In this case it is known to also use aluminum, steel or silicon carbide ceramics in addition to the cast iron. The carrier pot 5 and brake disk 2 are then joined to each other by very different joining methods, such as for example bolting, screwing together or casting.

With the brake disk device 1 shown in FIG. 1, the carrier pot 5 comprises a plurality of fastening points 6 and 7, which are used for fastening the carrier pot 5 to the brake disk 2 and to the wheel hub. For this purpose, the fastening points 6 are formed on a radially outer brake disk ring portion 8 and are disposed distributed uniformly over the circumference of the carrier pot 5. The fastening points 7 are disposed distributed uniformly over the circumference on a radial inner wheel hub ring portion 9 of the carrier pot 5. The connection to the brake disk 2 is carried out at the fastening points 6 and the connection to the wheel hub is carried out at the fastening points 7.

According to the present exemplary embodiment, the fastening points 6 are formed as fastening openings that are used for screwing together, bolting or riveting the carrier pot 5 to the wheel hub or to the brake disk 2. Alternatively, at least some of the fastening points 6 and/or 7 can also be embodied as in particular stud-shaped protrusions on the carrier pot 5. The fastening points 6 can also be embodied as pockets in which a separate fastening bolt can be cast or molded that protrudes axially from the carrier pot 5 in each case. The fastening points 6 are preferably implemented such that they are protected even from high thermal loads by the ventilation bores 4 or similar cooling arrangements, such as for example air gaps of the brake disk, or by the use of thermal insulation materials, such as for example ceramic bushes or ceramic coatings, in the vicinity of the fastening points 6.

According to the present exemplary embodiment, the carrier pot 5 is made of a fiber-plastic composite that guarantees a sufficiently high mechanical and thermal load capability with particularly low weight.

Figure 2:
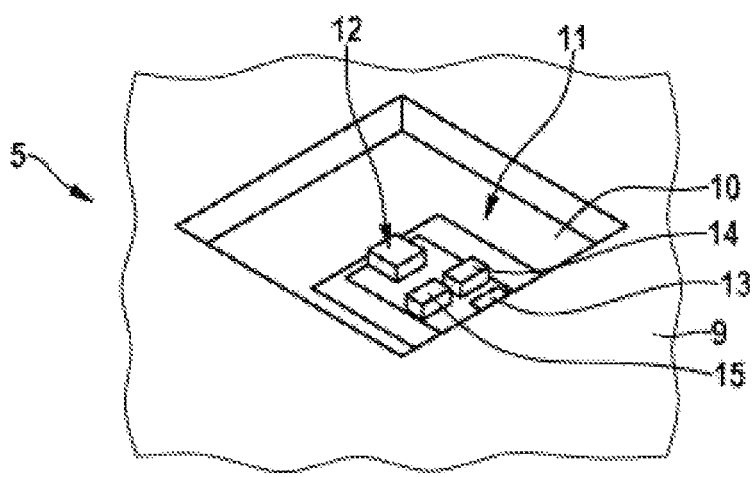
FIG. 2 shows a sectional representation of the carrier pot in a detailed view.

FIG. 2 shows a detailed view of the carrier pot 5 in the vicinity of the wheel hub ring portion 9, as shown by a dashed box in FIG. 1. In this case, the carrier pot 5 is sectioned so that that it is sectioned in the plane of the wheel hub ring portion 9 or perpendicular to the axis of rotation. As a result, it can be seen in FIG. 2 that the carrier pot 5 in the wheel hub ring portion 9 comprises a receiving recess 10. Here it can also be seen that the fiber-plastic composite comprises a plurality of layers, each preferably comprising identically oriented or running fibers, wherein the fibers of the adjacent or stacked layers are preferably oriented differently, in the present case being oriented perpendicularly to each other. As a result, high strength of the carrier pot 5 is guaranteed, so that even high braking forces can be transferred through the carrier pot 5 in both directions of rotation. Due to the sectional representation of FIG. 2, for example at least one of the upper layers is removed so that the view to the receiving recess 10 is unrestricted.

An electrical/electronic functional component 11 is disposed in the receiving recess 10. Whereas according to the present exemplary embodiment the receiving recess 10 is formed significantly larger than the functional component 11, it is preferably provided that the recess 10 corresponds to the size of the functional component 11.

In particular, it is provided that the functional component 11 is integrated in the carrier pot 5 during the manufacture of the carrier pot 5 such that it is completely enclosed by the layers of fiber-plastic composite. Advantageously, the receiving recess 10 is formed in so many layers that the functional component 11 can be completely accommodated therein. Alternatively, the functional component 11 is simply inserted between two adjacent layers during the manufacture of the carrier pot 5 and as a result is automatically enclosed by the layers of the carrier pot 5 during manufacture.

The functional component 11 is in particular an electrical circuit comprising at least one sensor module 12, which for example comprises an inertial sensor, an acceleration sensor, a position sensor, a temperature sensor, a pressure sensor, a material tension sensor and/or a speed sensor in order to detect operating states of the carrier pot 5 directly therein. It can also be provided that the sensor module 12 comprises a temperature sensor or moisture sensor, which is intended to detect the ambient temperature of the carrier pot 5. For this purpose, it is then preferably provided that the functional component 11 is not completely enclosed by the fiber-plastic composite but has at least partial access to the surroundings of the carrier pot 5. For this purpose, for example the receiving recess 10 is embodied so that there is a direct connection to the surroundings.

Furthermore, the circuit or the functional component 11 preferably comprises a communications interface 15 associated with the sensor module 12, so that the data detected by the sensor module 12 can be acquired contactlessly or with contact by an external control unit, test unit or analysis unit. It can also be provided that the sensor module comprises a power supply device 14, so that the operation of the sensor module 12 can be carried out without an external power supply.

Due to the arrangement of the functional component 11 on the carrier pot 5, the functional component 11 is disposed on an unsprung mass of the vehicle, whereby more accurate data are determined and made available compared to known solutions for state detection. By means of the functional component 11, continuous monitoring of the state of the carrier pot 5 as a safety-relevant component is guaranteed. Moreover, ambient conditions of the brake disk device 1, in particular of the carrier pot 5, can also be detected, such as for example the air humidity and/or air pressure. Depending on said values, in turn the brake disk device 1 can be advantageously actuated. Due to the irreversible or permanent connection between the carrier pot 5 and the functional component 11, moreover manipulation of the functional component 11 by a third party is not possible. If the functional component 11 is embodied in particular as an identification device 13 or comprises a such a device, moreover a positive identification of the carrier pot 5 is possible at all times.

Advantageously, the carrier pot 5 comprises a plurality of such functional components 11 that are integrated in the carrier pot 5 or in the fiber-plastic composite. The plurality of functional components 11 are then advantageously disposed distributed uniformly over the circumference of the carrier pot 5 in order to avoid imbalances. The carrier pot 5 preferably comprises at least one functional component 11, which is embodied as a sensor module 12, and a functional module 11, which is embodied as an identification device 13.

Due to the advantageous integration of the functional component 11 in the carrier pot 5, a high-precision speed measurement directly on the axis of the vehicle is possible. Moreover, the vehicle dynamics of the vehicle, in particular twisting of the vehicle, loss of adhesion, veering, skidding or similar can be detected. Moreover, the continual or continuous monitoring of the state of the brake disk 2 and in particular of the carrier pot 5 is possible. Due to active control, for example active cooling, or due to a warning to the driver, a sudden loss of brake force is ensured while taking into account the determined state of the carrier pot 5 and/or the surroundings thereof.

The invention claimed is:

1. A carrier pot for a brake disk, comprising:
   a radial inner hub ring portion configured to fasten to a wheel axle;
   a radially outer brake disk ring portion configured to fasten to the brake disk; and
   at least one electronic functional component,
   wherein the carrier pot comprises a fiber-plastic composite,
   wherein the at least one electronic functional component is integrated in the fiber-plastic composite, and
   wherein the radially outer brake disk ring portion includes fastening points for fastening the brake disk to the radially outer brake disk ring portion.

2. The carrier pot as claimed in claim 1, wherein the at least one electronic functional component is completely enclosed by the fiber-plastic composite.

3. The carrier pot as claimed in claim 1, wherein the at least one electronic functional component is only partly enclosed by the fiber-plastic composite.

4. The carrier pot as claimed in claim 1, wherein the at least one electronic functional component is positively fastened to the carrier pot by the fiber-plastic composite.

5. The carrier pot as claimed in claim 1, wherein the at least one electronic functional component includes a sensor module having at least one of an inertial sensor, an acceleration sensor, a speed sensor, a position sensor, a temperature sensor, a material tension sensor, a pressure sensor and a function sensor.

6. The carrier pot as claimed in claim 1, wherein the at least one electronic functional component includes a power supply device.

7. The carrier pot as claimed in claim 1, wherein the at least one electronic functional component includes a communications interface configured to send and/or to receive data contactlessly and/or with contact.

8. The carrier pot as claimed in claim 1, wherein the at least one electronic functional component includes a plurality of electronic functional components uniformly distributed over a circumference of the carrier pot in the fiber-plastic composite.

9. The carrier pot as claimed in claim 1, wherein the at least one electronic functional component includes an identification device.

10. A brake disk device for a wheel brake of a vehicle, comprising:
    at least one brake disk including at least one carrier pot rotationally fixedly joined to the at least one brake disk, the at least one carrier pot including:
    a radial inner hub ring portion configured to fasten to a wheel axle;
    a radially outer brake disk ring portion configured to fasten to the at least one brake disk; and
    at least one electronic functional component,
    wherein the at least one carrier pot comprises a fiber-plastic composite, and
    wherein the at least one electronic functional component is integrated in the fiber-plastic composite, and
    wherein the radially outer brake disk ring portion includes fastening points for fastening the brake disk to the radially outer brake disk ring portion.

11. The carrier pot as claimed in claim 6, wherein the power supply device is an electrical generator and/or a receiver for supplying power wirelessly.

12. The carrier pot as claimed in claim 7, wherein the communications interface is configured to send and/or to receive data of a sensor module.

13. The carrier pot as claimed in claim 9, wherein the identification device is an RFID chip.

14. The brake disk device according to claim 10, wherein the vehicle is a motor vehicle.

\* \* \* \* \*